United States Patent
Ray et al.

(10) Patent No.: US 12,388,664 B2
(45) Date of Patent: Aug. 12, 2025

(54) DEVICE AUTHORIZATION USING A DIRECTORY SYSTEM

(71) Applicant: Microsoft Technology Licensing, LLC, Redmond, WA (US)

(72) Inventors: Mayukh Ray, Sammamish, WA (US); Alistair James Lowe, Ipswich (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 259 days.

(21) Appl. No.: 18/332,079

(22) Filed: Jun. 9, 2023

(65) Prior Publication Data
US 2024/0414012 A1    Dec. 12, 2024

(51) Int. Cl.
*H04L 9/32* (2006.01)

(52) U.S. Cl.
CPC .......... *H04L 9/3268* (2013.01); *H04L 9/3213* (2013.01)

(58) Field of Classification Search
CPC ............................. H04L 9/3268; H04L 9/3213
USPC ......................................................... 713/156
See application file for complete search history.

(56) References Cited

U.S. PATENT DOCUMENTS

| | | | | |
|---|---|---|---|---|
| 10,193,700 B2 * | 1/2019 | Liu | ..................... | H04W 12/069 |
| 10,743,176 B1 * | 8/2020 | Khan | ..................... | H04W 12/48 |
| 11,042,609 B2 * | 6/2021 | Pala | ..................... | H04L 9/3268 |
| 11,750,591 B2 * | 9/2023 | Sinha | ..................... | H04L 9/0897 |
| | | | | 713/156 |
| 2003/0097570 A1 * | 5/2003 | Wheeler | ............... | H04L 9/3247 |
| | | | | 713/180 |
| 2012/0036364 A1 * | 2/2012 | Yoneda | ................... | H04L 9/006 |
| | | | | 713/175 |
| 2018/0007035 A1 | 1/2018 | Zhang | | |
| 2021/0226951 A1 | 7/2021 | Goldstein | | |
| 2021/0314312 A1 * | 10/2021 | Xu | ....................... | G06F 16/9535 |
| 2024/0146536 A1 * | 5/2024 | Das | ....................... | H04L 9/3213 |

OTHER PUBLICATIONS

Campbell, et al., "OAuth 2.0 Mutual—TLS Client Authentication and Certificate—Bound Access Tokens; rfc8705.txt", Internet engineering task Force—IETF, Feb. 29, 2020, pp. 1-14.
International Search Report and Written Opinion received for PCT Application No. PCT/US2024/031520, Oct. 2, 2024, 14 pages.
Martins, et al., "Iris: Secure reliable live-streaming with opportunistic mobile edge cloud offloading", Future Generation Computer Systems, vol. 101, Dec. 2019, pp. 272-292.

* cited by examiner

*Primary Examiner* — Thanh T Le
(74) *Attorney, Agent, or Firm* — Workman Nydegger (57) ABSTRACT

Methods and systems are described which obtain a service token at an edge device. Embodiments obtain a device certificate from an authentication service based on a private key which is associated with a public key. The public key is further associated with a device identifier for the edge device at a directory service. Embodiments send a request for a service token to an authentication service from a directory service based on the private key where the directory service has identified the public key for the edge device. Other embodiments extract the device identifier from the device certificate and send a request for a service token to the directory service, where the request includes the device certificate and the device identifier. Embodiments receive the service token from the directory service and use the service token to access a service.

20 Claims, 4 Drawing Sheets

DEVICE AUTHORIZATION USING A DIRECTORY SYSTEM

BACKGROUND

Internet of Things devices have the ability to connect to platforms to access services. These devices can connect to services based on certificates possessed by those devices.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

In some aspects, the techniques described herein relate to a method for obtaining a service token at an edge device, implemented at a computer system that includes a processor, including: based on a private key at the edge device, obtaining a device certificate from an authentication service, wherein the private key is associated with a public key, the public key being associated with a device identifier for the edge device at a directory service; based on the private key, sending a request for a service token to the authentication service from a directory service, wherein the directory service has identified the public key for the edge device; receiving the service token from the authentication service; and using the service token to access a service.

In some aspects, the techniques described herein relate to a method for obtaining a service token at an edge device, implemented at a computer system that includes a processor, including: based on a private key at the edge device, obtaining a device certificate from an authentication service, wherein the private key is associated with a public key, the public key being associated with a device identifier for the edge device at a directory service; extracting the device identifier from the device certificate; sending a request for a service token to the directory service, wherein the request includes the device certificate and the device identifier; receiving the service token from the directory service based on the directory service identifying the public key for the edge device; and using the service token to access a service.

In some aspects, the techniques described herein relate to a computer system including: a processing system; and a computer storage media that stores computer-executable instructions that are executable by the processing system to at least: based on a private key at the edge device, obtain a device certificate from an authentication service, wherein the private key is associated with a public key, the public key being associated with a device identifier for the edge device at a directory service; derive a device identifier from the device certificate; send a request for a service token to the directory service, wherein the request includes the device certificate and the device identifier; receive the service token from the directory service based on the directory service identifying the public key for the edge device; and use the service token to access a service.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which.

DETAILED DESCRIPTION

Edge devices, such as Internet of Things devices, are capable of connecting to online services by utilizing authentication and attestation, resulting in the use of services provided by online service providers. For example, after an edge device boots up, it connects to an online service, such as a cloud service. Based on information provided by the edge device to the cloud service, such as a certificate, the cloud service determines whether the edge device is valid. However, in some instances, a counterfeit device may be authenticated using a counterfeit certificate. In these cases, the counterfeit device could fraudulently access the cloud service. Therefore, there is an ongoing need to provide secure device service tokens to authentic devices allowing the authentic devices to access the online services while avoiding providing counterfeit devices access to online services.

The embodiments described herein are directed to securely provisioning an edge device with a service token, which allows the edge device to securely access an online service provided by an online application platform. For example, an edge device may use a service token to request access to an online service found on an application platform such as AZURE SPHERE from MICROSOFT CORPORATION of Redmond, Washington. In embodiments, to access an online service, the edge device initially sends measurement data to a directory service. The directory service uses this measurement information to determine if the edge device is authentic or not. If the edge device is determined by the directory service to be authentic, the edge device is permitted to obtain a device certificate from an authentication service. The authentication service sends the device certificate to the edge device based on a private key stored in the edge device and a public key. The public key is associated with the edge device and is stored in the directory service. In one example, the public key is associated with the edge device at the directory service using a unique device identifier of the edge device. Once the edge device obtains the device certificate from the authentication service, the edge device uses the device certificate to request a service token for accessing an online service.

By securely obtaining service tokens at edge devices via the use of device certificates that are issued to the edge devices in the manner disclosed, the disclosed embodiments provide authentic devices access to online services while preventing counterfeit devices from accessing the online services.

Figure 1:
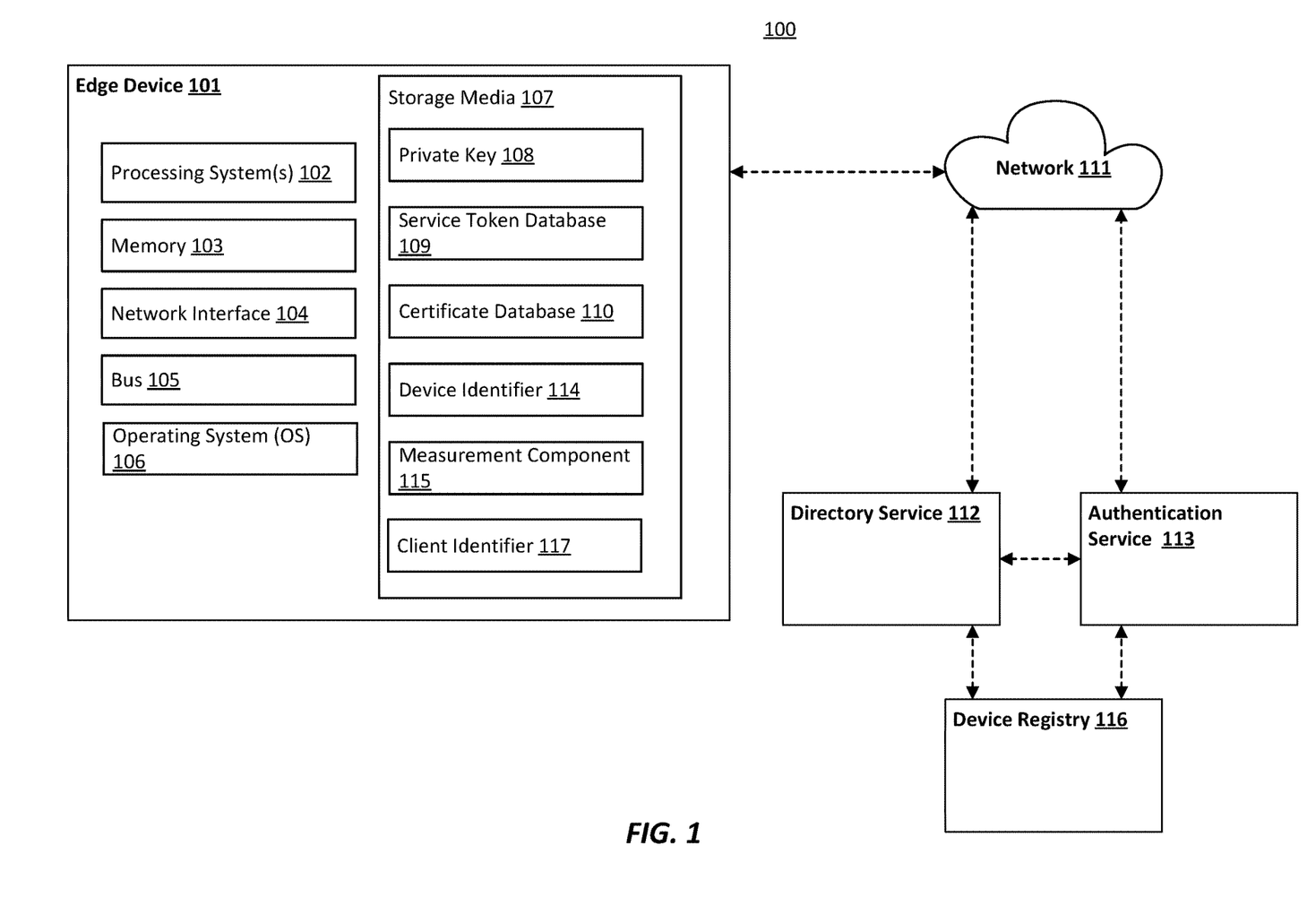
FIG. 1 illustrates an example computer architecture that facilitates an edge device obtaining a service token.

FIG. 1 illustrates an example of a computer architecture 100 that facilitates obtaining a service token at an edge device. In FIG. 1, the computer architecture 100 includes an edge device 101 comprising processing system(s) 102 (e.g., a single processor or a plurality of processors), memory 103 (e.g., system or main memory), operating system (OS) 106, storage media 107 (e.g., a single computer-readable storage medium, or a plurality of computer-readable storage media), all interconnected by a bus 105. In embodiments, edge device 101 also includes a network interface 104 (e.g., one or more network interface cards) for forming local or wide-area network connections via network 111. Lastly, computer architecture 100 also includes a directory service 112 (e.g., AZURE ACTIVE DIRECTORY from MICROSOFT CORPORATION of Redmond, Washington; OKTA WORKFORCE IDENTITY from OKTA INCORPORATED of San Francisco, California), an authentication service 113, and a device registry 116, which are interconnected to one another and the edge device 101 via the network 111.

The storage media 107 is illustrated as storing data. In some embodiments, the data includes a private key 108 (from an asymmetric public/private key pair) associated with the edge device 101. In embodiments, the private key 108 is stored on the edge device 101 during manufacturing of the edge device 101. In some embodiments, a public key 207 (see FIG. 2) that corresponds to private key 108 is also stored on the edge device 101 during manufacturing of the edge device 101.

The storage media 107 is also illustrated as storing a service token database 109 and a certificate database 110. In embodiments, the service token database 109 stores one or more service tokens obtained by the edge device, while the certificate database 110 stores one or more certificates obtained by the edge device 101. In embodiments, the edge device 101 obtains certificate(s) from the authentication service 113 and stores those certificate(s) in the certificate database 110. In some embodiments, the edge device 101 receives service token(s) from the authentication service 113 and stores those service token(s) in the service token database 109. In other embodiments, the edge device 101 receives service token(s) from the directory service 112 and stores those service token(s) in the service token database 109.

In embodiments, storage media 107 also stores a device identifier 114, which is unique to edge device 101 and a client identifier 117, which is unique to the client with which the edge device 101 is associated. In embodiments, the device identifier 114 is extracted from a device certificate stored in the certificate database 110. The device identifier 114 may be extracted, in some embodiments, by the OS 106 of the edge device 101.

In embodiments, the edge device 101 obtains a device certificate based on using a measurement component 115 to measure a state of the edge device 101 and sends that measurement to the directory service 112. In embodiments, the measured edge device state includes information about the OS 106 (e.g., a version of the OS 106), information about other software operating at the edge device 101, information about a bootup state of the edge device 101, and the like.

Figure 2:
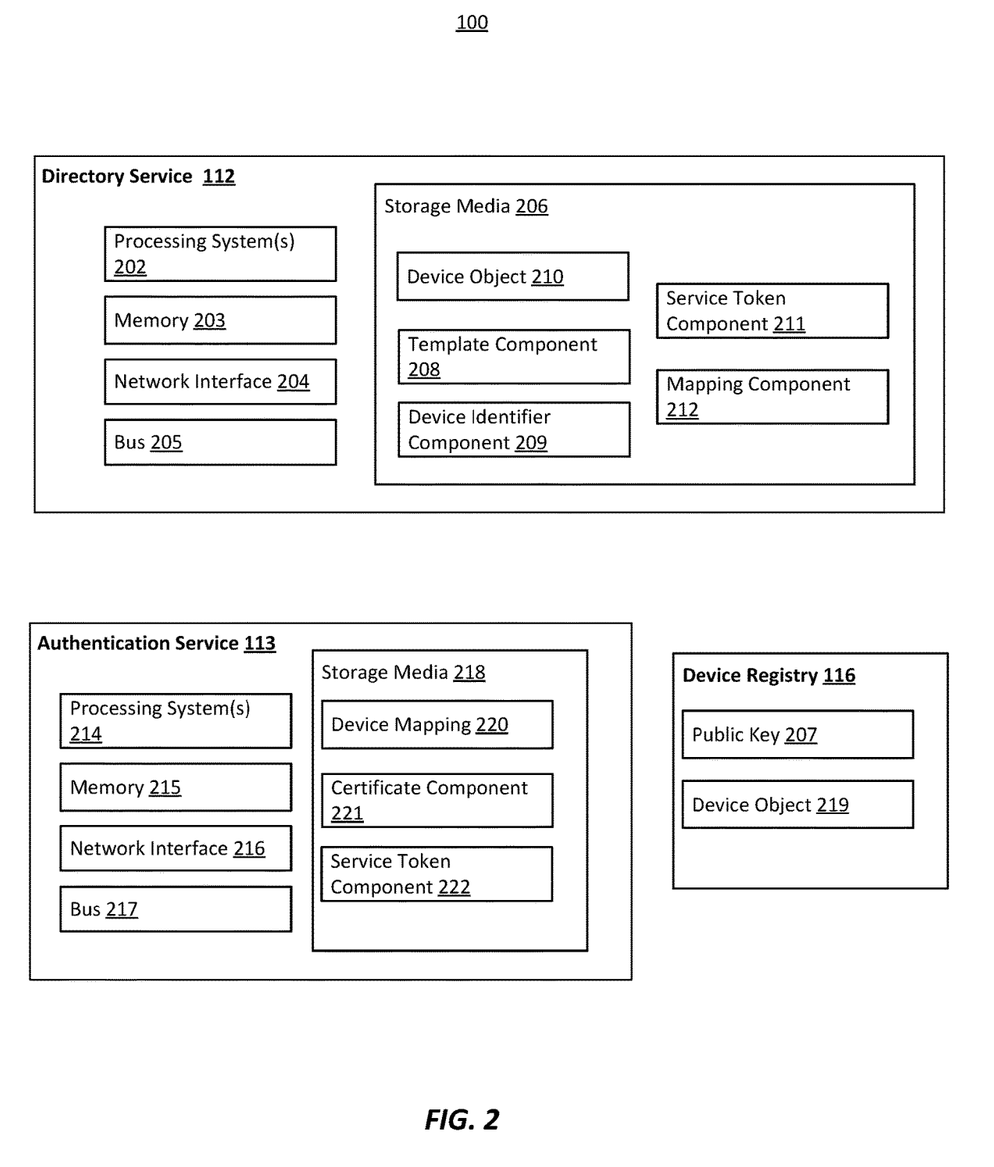
FIG. 2 illustrates an example computer architecture of a directory service and an authentication service.

FIG. 2 illustrates another example of the computer architecture 100 of FIG. 1, with details regarding the directory service 112, the authentication service 113, and the device registry 116. As shown in FIG. 2, in embodiments, the directory service 112 comprises processing system(s) 202 (e.g., a single processor or a plurality of processors), memory 203 (e.g., system or main memory), storage media 206 (e.g., a single computer-readable storage medium, or a plurality of computer-readable storage media), all interconnected by a bus 205. In embodiments, the directory service 112 also includes a network interface 204 (e.g., one or more network interface cards) for forming local or wide-area network connections via the network 111 (see FIG. 1). Similarly, in embodiments, the authentication service 113 comprises processing system(s) 214 (e.g., a single processor or a plurality of processors), memory 215 (e.g., system or main memory), storage media 218 (e.g., a single computer-readable storage medium, or a plurality of computer-readable storage media), all interconnected by a bus 217. In embodiments, the authentication service 113 also includes a network interface 216 (e.g., one or more network interface cards) for forming local or wide-area network connections via the network 111 (see FIG. 1).

Referring to directory service 112, storage media 206 is illustrated as storing computer-executable instructions implementing a template component 208, a device identifier component 209, a service token component 211, and a mapping component 212. Additionally, the storage media 206 is illustrated as storing data such as a device object 210 associated with the edge device 101.

The device registry 116 is illustrated as storing data such as a public key 207, which cryptographically corresponds to the private key 108 of the edge device 101, and a device object 219 associated with the edge device 101. In embodiments, the device object 219 associates the public key 207 with the device identifier 114 of the edge device 101. In some embodiments, the directory service 112 obtains public key 207 from the device registry 116 or from the edge device 101 directly (e.g., during provisioning of edge device 101 within computer architecture 100) or from a manufacturer of edge device 101.

The authentication service 113 is also referred to as the device attestation and authentication service. In some embodiments, the authentication service 113 performs both authentication tasks as well as attestation tasks. The storage media 218 is illustrated as storing computer-executable instructions implementing at least a certificate component 221 and a service token component 222. Storage media 218 is also illustrated as storing data such as a device mapping 220. In embodiments, the authentication service 113 uses the certificate component 221 to generate a device certificate for the edge device 101. In embodiments, the generated device certificate is based on the public key 207, such that the generated device certificate is usable by edge device 101 based on its possession of private key 108. In an embodiment, authentication service 113 obtains the public key 207 from one or more of the edge device 101, the device registry 116, or the directory service 112. In embodiments, authentication service 113 generates the device certificate based on receiving confirmation from the directory service 112 that the public key 207 of edge device 101 corresponds to the device identifier 114 of the edge device 101 (e.g., based on device object 210).

In embodiments, the directory service 112 associates the public key 207 stored in the device registry 116 with a device identifier 114 stored in the storage media 206. In embodiments, the device identifier component 209 creates the device identifier 114 for the edge device 101. While a variety of device identifier types can be used, in embodiments, the device identifier component 209 generates a globally-unique identifier (GUID) (e.g. a 128-bit or a 256-bit GUID). In embodiments, the device identifier component 209 stores the created device identifier 114 in the device certificate created by the certificate component 221 at the authentication service 113. In embodiments, this enables the edge device 101 to obtain the device identifier 114 by extracting the device identifier 114 from the device certificate (e.g., using the OS 106 of the edge device 101). In embodiments, a template component 208 creates a device template that specifies the general parameters of edge device 101, such as manufacturer, model, OS, and the like.

Embodiments create device object 210 associated with the edge device 101 and store that device object 210 in the storage media 206 of the directory service 112. Embodiments also create device object 219 associated with the edge device 101 and store that device object 219 in the device registry 116. A mapping component 212 at the directory service 112 maps the device object 210 and the device object 219 and stores that mapping in a device mapping 220 at the authentication service 113. In embodiments, the mapping component 212 maps the device identifier 114 with a device certificate and sends the device mapping 220 to the authentication service 113. The authentication service 113, in turn, stores the device mapping 220 in the storage media 218.

In some embodiments, the edge device 101 sends a request to the authentication service 113 for a service token that is used to access an online service. In these embodiments, the request is based on the device certificate generated by the authentication service 113. Once the authentication service 113 receives the request for the service token, the service token component 222 creates the service token and sends the service token to the edge device 101. The edge device 101 receives the service token and stores the service token in the service token database 109. The edge device 101 then uses the service token stored in the service token database 109 to access an online service (e.g., an AZURE SPHERE application).

Embodiments are now described in connection with FIGS. 3 and 4, which illustrate flow charts of example methods 300 and 400 for obtaining a service token at an edge device. In embodiments, instructions for implementing methods 300 and 400 are encoded as computer-executable instructions (e.g., device identifier component 209, service token component 211, and certificate component 221) stored on a computer storage media (e.g., storage media 107, 206, and 218) that are executable by a processing system (e.g., processing system(s) 102, 202, and 214) to cause a computer system (e.g., edge device 101, directory service 112, authentication service 113) to perform the method.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 3:
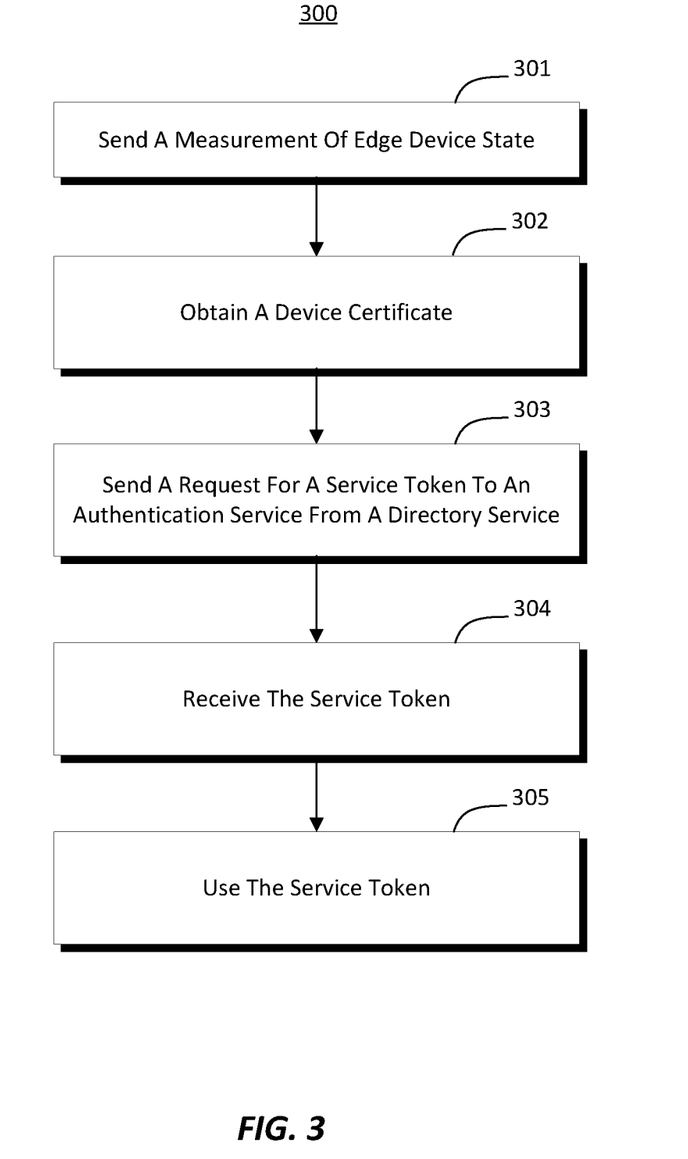
FIG. 3 illustrates a flow chart of an example method for obtaining a service token from an authentication service.

Referring to FIG. 3, method 300 illustrates an embodiment in which the edge device 101 obtains a service token from the directory service 112 directly. In some embodiments, method 300 comprises act 301 of sending a measurement of edge device state. In some embodiments, act 301 comprises sending a measurement of edge device state to a directory service. For example, the measurement component 115 at the edge device 101 measures edge device state of the edge device 101. In embodiments, the measured edge device state includes information about the OS 106 of the edge device 101 (e.g., OS version information), information about other software operating at the edge device 101, information about a bootup state of the edge device 101, and the like. In embodiments, the edge device 101 sends this measurement of the edge device state to the directory service 112. In embodiments, the directory service 112 uses this measurement to determine whether the edge device 101 is an authentic device or a counterfeit device.

Method 300 also comprises an act 302 of obtaining a device certificate. In some embodiments, act 302 comprises, based on the possession of a private key at the edge device, obtaining a device certificate from an authentication service. For example, the edge device 101 obtains a device certificate from authentication service 113 and stores that certificate in the certificate database 110. In embodiments, the authentication service 113 uses the certificate component 221 to generate the device certificate for the edge device 101.

In embodiments, the private key is associated with the public key, and the public key is associated with a device identifier for the edge device at the device registry. For example, the private key 108 and the public key 207 form an asymmetric cryptographic key pair that was created during the manufacturing of edge device 101. In embodiments, the private key 108 (and, potentially, public key 207) is stored on the edge device 101 during manufacturing of the edge device 101. In embodiments, the directory service 112 receives the public key 207 (e.g., from the edge device 101, from a manufacturer of edge device 101), and the directory service 112 creates the device identifier 114 for the edge device 101 (device identifier component 209). The directory service 112 further maps the identity of the edge device 101 with the public key 207 using the mapping component 212. The mapping component also maps the device object 210 with a device object 219 stored in the device registry 116 and sends a device mapping 220 to the authentication service 113.

Method 300 also comprises act 303 of sending a request for a service token to an authentication service from a directory service. In some embodiments, act 303 comprises, based on the private key, sending a request for a service token to the authentication service from a directory service, wherein the directory service has identified the public key for the edge device.

Method 300 also comprises act 304 of receiving the service token. In some embodiments, act 304 comprises receiving the service token from the authentication service. In embodiments, the service token component 222 creates the service token after receiving a request and sends the service token to the edge device 101. The edge device 101 then stores the service token in the service token database 109.

Method 300 also comprises act 305 of using the service token. In some embodiments, act 304 comprises using the service token to access a service. In embodiments, once the edge device 101 has stored the service token in the service token database 109, the edge device 101 uses the service token to access services (e.g., applications found in AZURE SPHERE or similar application platforms).

Figure 4:
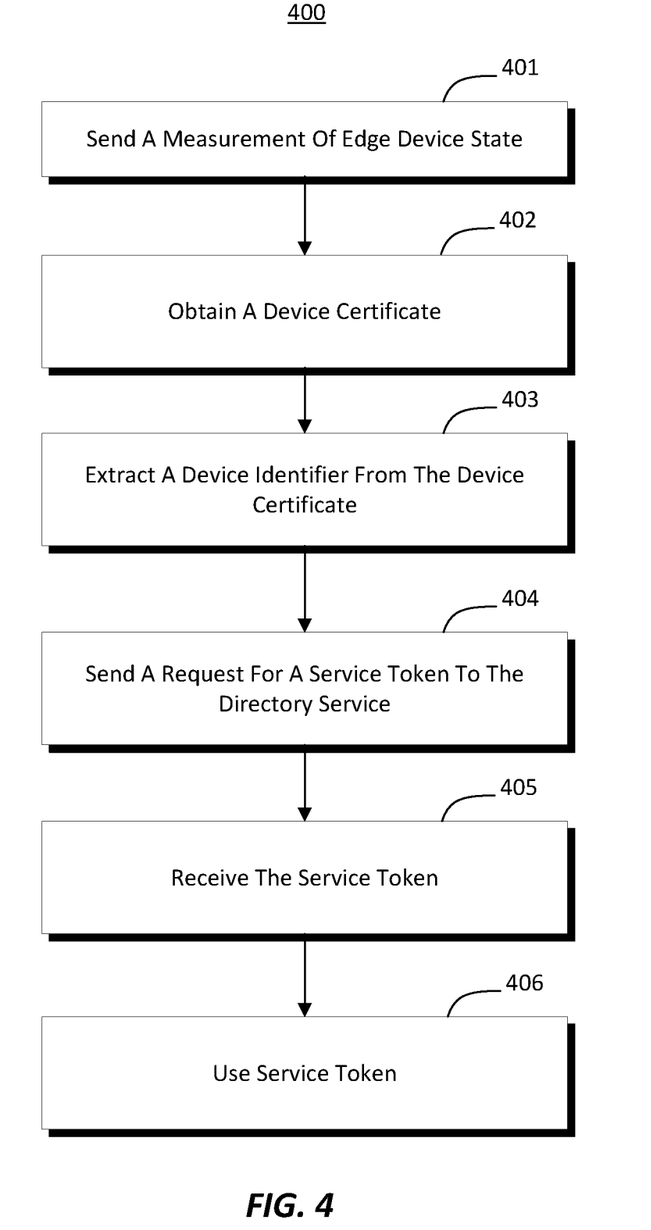
FIG. 4 illustrates a flow chart of an example method for obtaining a service token from a directory service.

Referring to FIG. 4, method 400 illustrates an embodiment in which the edge device 101 obtains a service token from the directory service 112 via the authentication service 113. In embodiments, method 400 comprises act 401 of sending a measurement of edge device state. In some embodiments, act 401 comprises sending a measurement of edge device state to the directory service. For example, the measurement component 115 at the edge device 101 measures the edge device state the edge device 101. The measured edge device state includes information about the OS 106 of the edge device 101 (e.g., OS version information), information about other software operating at the edge device 101, information about a bootup state of the edge device 101, and the like. In embodiments, the edge device 101 sends this measurement of the edge device state to the directory service 112. In embodiments, the directory service 112 uses this measurement to determine whether the edge device 101 is an authentic device or a counterfeit device.

Method 400 also comprises an act 402 of obtaining a device certificate. In some embodiments, act 402 comprises, based on a private key at the edge device, obtaining a device certificate from an authentication service. For example, the edge device 101 obtains a device certificate from authentication service 113 and stores that certificate in the certificate database 110. In embodiments, the authentication service 113 uses the certificate component 221 to generate the device certificate for the edge device 101.

In embodiments, the private key is associated with the public key, and the public key is associated with a device identifier for the edge device at the directory service. For example, the private key 108 and the public key 207 form an asymmetric cryptographic key pair that was created during the manufacturing of edge device 101. In embodiments, the private key 108 (and, potentially, public key 207) is stored on the edge device 101 during manufacturing of the edge device 101. In embodiments, the directory service 112 receives the public key 207 (e.g., from the edge device 101, from a manufacturer of edge device 101), and the directory service 112 creates the device identifier 114 for the edge device 101 (device identifier component 209). The directory service 112 further maps the identity of the edge device 101 with the public key 207 using the mapping component 212. The mapping component also maps the device object 210 with a device object 219 stored in the device registry 116 and sends a device mapping 220 to the authentication service 113.

Method 400 also comprises act 403 of extracting a device identifier from the device certificate. In some embodiments, act 403 comprises extracting the device identifier from the device certificate. In embodiments, the device identifier 114 is stored in the device certificate using the device identifier component 209. The edge device 101 receives this device certificate and stores the certificate in the certificate database 110. The edge device 101 then extracts the device identifier 114 from the device certificate (e.g., using the OS 106 of the edge device 101). The edge device 101 stores the device identifier 114 in the storage media 107.

Method 400 also comprises act 404 of sending a request for a service token to the directory service. In some embodiments, act 404 comprises sending a request for a service token to the directory service where the request includes the device certificate and the device identifier. In some embodiments, the request includes the client identifier as well as the device certificate and the device identifier.

Method 400 also comprises act 405 of receiving the service token. In some embodiments, act 405 comprises receiving the service token from the directory service based on the directory service identifying the public key for the edge device. In embodiments, the directory service 112 receives the request from the edge device 101 for a service token and identifies the public key 207, which corresponds to the edge device 101. The service token component 211 creates the service token and sends the service token to the edge device. The edge device 101 stores the service token in the service token database 109.

Method 400 also comprises act 406 of using the service token. In some embodiments, act 406 comprises using the service token to access a service. In embodiments, once the edge device 101 has stored the service token in the service token database 109, the edge device 101 may use the service token to access services (e.g., applications found in AZURE SPHERE or similar application platforms).

Embodiments of the disclosure may comprise or utilize a special-purpose or general-purpose computer system (e.g., edge device 101, directory service 112, and authentication service 113) that includes computer hardware, such as, for example, a processing system (e.g., processing system(s) 102, 202, and 214) and system memory (e.g., memory 103, 203, and 215), as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 107, 206, and 218). Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links that can be used to carry program code in the form of computer-executable instructions or data structures and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 104), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (SaaS), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an OS and perhaps one or more other applications as well. In some embodiments, each host includes a hypervisor that emulates virtual resources for the virtual machines using physical resources that are abstracted from the view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method implemented at an edge device computer system that includes a processing system, comprising:
   based on a private key at the edge device, obtaining a device certificate from an authentication service, wherein the private key is associated with a public key, the public key being associated with a device identifier for the edge device at a directory service;
   based on the private key, sending a request for a service token to the authentication service from the directory service, wherein the directory service has identified the public key for the edge device;
   receiving the service token from the authentication service; and
   using the service token to access a service.

2. The method of claim 1, further comprising sending a measurement of edge device state to the authentication service.

3. The method of claim 1, wherein the device identifier for the edge device is mapped with the public key for the edge device.

4. The method of claim 1, wherein the device identifier for the edge device is created by the directory service.

5. The method of claim 1, wherein a first object of the edge device stored in the directory service is mapped with a second object of the edge device stored in a device registry.

6. The method of claim 1, wherein the private key is stored on the edge device during manufacturing, and wherein the public key is stored in a device registry.

7. A method implemented at a computer system that includes a processing system, comprising:
   based on a private key at an edge device, obtaining a device certificate from an authentication service, wherein the private key is associated with a public key, the public key being associated with a device identifier for the edge device at a directory service;
   extracting the device identifier from the device certificate;
   sending a request for a service token to the directory service, wherein the request includes the device certificate, a client identifier, and the device identifier;
   receiving the service token from the directory service based on the directory service identifying the public key for the edge device; and
   using the service token to access a service.

8. The method of claim 7, wherein an operating system on the edge device extracts the device identifier from the device certificate.

9. The method of claim 7, further comprising sending a measurement of edge device state to the authentication service.

10. The method of claim 7, wherein the device identifier for the edge device is mapped with the public key for the edge device.

11. The method of claim 7, wherein the device identifier for the edge device is created by the directory service.

12. The method of claim 7, wherein a first object of the edge device stored in the directory service is mapped with a second object of the edge device stored in a device registry.

13. The method of claim 7, wherein the private key is stored on the edge device during manufacturing, and wherein the public key is stored in a device registry.

14. A computer system comprising:
a processing system; and
a computer storage media that stores computer-executable instructions that are executable by the processing system to at least:
based on a private key at an edge device, obtain a device certificate from an authentication service, wherein the private key is associated with a public key, the public key being associated with a device identifier for the edge device at a directory service;
extract the device identifier from the device certificate;
send a request for a service token to the directory service, wherein the request includes the device certificate and the device identifier;
receive the service token from the directory service based on the directory service identifying the public key for the edge device; and
use the service token to access a service.

15. The computer system of claim 14, wherein an operating system on the edge device extracts the device identifier from the device certificate.

16. The computer system of claim 14, the computer-executable instructions also executable by the processing system to send a measurement of edge device state to the authentication service.

17. The computer system of claim 14, wherein the device identifier for the edge device is mapped with the public key for the edge device.

18. The computer system of claim 14, wherein the device identifier for the edge device is created by the directory service.

19. The computer system of claim 14, wherein a first object of the edge device stored in the directory service is mapped with a second object of the edge device stored in a device registry.

20. The computer system of claim 14, wherein the private key is stored on the edge device during manufacturing, and wherein the public key is stored in a device registry.

* * * * *